United States Patent
Alzate Perez et al.

(10) Patent No.: US 9,506,776 B2
(45) Date of Patent: Nov. 29, 2016

(54) ADAPTIVE SAMPLING OF SMART METER DATA

(71) Applicant: International Business Machines Corporation, Armonk, NY (US)

(72) Inventors: Carlos A. Alzate Perez, Dublin (IE); Francesco Fusco, Kilcock (IE); Pascal Pompey, Nanterre (FR); Mathieu Sinn, Dublin (IE); Michael Wurst, Stuttgart (DE)

(73) Assignee: International Business Machines Corporation, Armonk, CA (US)

( * ) Notice: Subject to any disclaimer, the term of this patent is extended or adjusted under 35 U.S.C. 154(b) by 186 days.

(21) Appl. No.: 14/455,422

(22) Filed: Aug. 8, 2014

(65) Prior Publication Data

US 2016/0041002 A1   Feb. 11, 2016

(51) Int. Cl.
  *G08B 23/00* (2006.01)
  *G01D 4/00* (2006.01)
  *H04W 4/00* (2009.01)
  *H04L 29/08* (2006.01)

(52) U.S. Cl.
  CPC .......... *G01D 4/004* (2013.01); *H04W 4/005* (2013.01); *H04L 67/1095* (2013.01)

(58) Field of Classification Search
  None
  See application file for complete search history.

(56) References Cited

U.S. PATENT DOCUMENTS

| | | | |
|---|---|---|---|
| 6,614,808 B1 | 9/2003 | Gopalakrishna | |
| 7,492,789 B2 | 2/2009 | Shvodian | |
| 8,443,071 B2 | 5/2013 | Lu et al. | |
| 8,555,400 B2 | 10/2013 | Shi et al. | |
| 8,577,510 B2 | 11/2013 | Powell et al. | |
| 2011/0029655 A1* | 2/2011 | Forbes, Jr. | G06Q 10/00 709/223 |
| 2011/0271352 A1 | 11/2011 | Kalogridis et al. | |
| 2013/0079938 A1* | 3/2013 | Lee | G06Q 30/02 700/291 |
| 2013/0103215 A1 | 4/2013 | Dai et al. | |
| 2013/0154849 A1 | 6/2013 | Denic et al. | |
| 2014/0019397 A1* | 1/2014 | Alexander | G06N 5/02 706/46 |

FOREIGN PATENT DOCUMENTS

| | | |
|---|---|---|
| WO | 2004079971 A2 | 9/2004 |
| WO | 2012047489 A1 | 4/2012 |
| WO | 2014031041 A1 | 2/2014 |

OTHER PUBLICATIONS

Caione et al., "Distributed Compressive Sampling for Lifetime Optimization in Dense Wireless Sensor Networks", IEEE Transactions on Industrial Informatics, vol. 8, Issue 1, 2012, <http://ieeexplore.ieee.org/stamp/stamp.jsp?tp=&arnumber=6060911>.
Chen et al, "Adaptive Data Aggregation Scheme in Clustered Wireless Sensor Networks", Computer Communications, 2008, <http://202.114.89.42/resource/pdf/2926.pdf>.
(Continued)

*Primary Examiner* — Brian Zimmerman
*Assistant Examiner* — Thomas McCormack
(74) *Attorney, Agent, or Firm* — Maeve Carpenter

(57) ABSTRACT

In an approach for adaptive sampling of smart meter data, a computer retrieves one or more balancing constraints associated with one or more smart meter sensors. The computer retrieves meter sensor data from the one or more smart meter sensors according to the one or more balancing constraints. The computer determines a subsample of the meter sensor data, and then transmits the subsample of the meter sensor data to an optimization engine for use in solving an optimization problem.

17 Claims, 4 Drawing Sheets

(56) References Cited

OTHER PUBLICATIONS

Cheng et al., "Sampling Based (epsilon, delta)-Approximate Aggregation Algorithm in Sensor Networks", IEEE International Conference on Distributed Computing Systems, 2009, <http://ieeexplore.ieee.org/stamp/stamp.jsp?tp=&arnumber=5158435&tag=1>.

Commuri et al., "Dynamic Data Aggregation in Wireless Sensor Networks", IEEE 22nd International Symposium on Intelligent Control, 2007, <http://ieeexplore.ieee.org/stamp/stamp.jsp?tp=&arnumber=4450851>.

Erkin et al., "An Overview of Privacy-Preserving Data Aggregation in Smart Metering Systems", 2013, <http://ieeexplore.ieee.org/stamp/stamp.jsp?tp=&arnumber=6461626>.

Erkin et al., "Private Computation of Spatial and Temporal Power Consumption with Smart Meters", Int. Conf. Applied Cryptography and Network Security, 2012, <http://www.ics.uci.edu/~gts/paps/ACNS12.pdf>.

Garcia et al., "Privacy-Friendly Energy-Metering via Homomorphic Encryption", 6th Workshop Security and Trust Management (STM), vol. 6710, 2010, <http://rd.springer.com/chapter/10.1007%2F978-3-642-22444-7_15>.

Guerreiro et al., "Privacy-Aware Probabilistic Sampling for Data Collection in Wireless Sensor Networks", IEEE Wireless Communication Letters, vol. 1, No. 2, 2012, <http://ieeexplore.ieee.org/stamp/stamp.jsp?tp=&arnumber=5982552>.

He et al., "Privacy-preserving Data Aggregation in Wireless Sensor Networks", INFOCOM, 26th IEEE International Conference on Computer Communications, 2007, <http://ieeexplore.ieee.org/stamp/stamp.jsp?tp=&arnumber=4215819>.

Heemels et al., "An Introduction to Event-triggered and Self-triggered Control", 51st IEEE Conf. on Decision and Control, 2012, <http://ieeexplore.ieee.org/stamp/stamp.jsp?tp=&arnumber=6425820>.

Huang et al., "Dynamic Sampling Rate Adjustment for Compressive Spectrum Sensing over Cognitive Radio Network", IEEE Wireless Communication Letters, vol. 1, No. 2, 2012, <http://ieeexplore.ieee.org/stamp/stamp.jsp?tp=&arnumber=6129373>.

Jain et al., "Adaptive Sampling for Sensor Networks", DMSN'04, VLDB 2004, <http://citeseerx.ist.psu.edu/viewdoc/download?doi=10.1.1.295.7696&rep=rep1&type=pdf>.

Kho et al., "Decentralized Control of Adaptive Sampling in Wireless Sensor Networks", ACM Transactions on Sensor Networks, 2009, <http://eprints.soton.ac.uk/266579/1/TOSN11August2008.pdf>.

Kulkarni, Homepage, Smart Grid AMI Mesh Networks, 2012, <sites.google.com/site/kulkarniparag/home>.

Kursawe et al., "Privacy-friendly Aggregation for the Smart grid", Privacy Enhanced Technologies Symposium, 2011, <http://citeseerx.ist.psu.edu/viewdoc/download?doi=10.1.1.221.2157&rep=rep1&type=pdf>.

Mahmudimanesh et al., "Balanced Spatio-Temporal Compressive Sensing for Multi-hop Wireless Sensor Networks", IEEE 9th Intl. Conf. on Mobile Adhoc and Sensor Systems (MASS), 2012, <http://ieeexplore.ieee.org/stamp/stamp.jsp?tp=&arnumber=6502539>.

Masoum et al., "Quality Aware Decentralized Adaptive Sampling Strategy in Wireless Sensor Networks", 9th International Conference on Ubiquitous Intelligence and Computing and 9th International Conference on Autonomic and Trusted Computing, 2012, <http://ieeexplore.ieee.org/stamp/stamp.jsp?tp=&arnumber=6332012>.

Taban et al., "Data Aggregation as a Method of Protecting Privacy in Smart Grid Networks", IEEE Smart Grid, 2012, <http://smartgrid.ieee.org/march-2012/525-data-aggregation-as-a-method-of-protecting-privacy-in-smart-grid-networks>.

Wu et al., "Robust and Dynamic Data Aggregation in Wireless Sensor Networks", 9th International Conference on Ubiquitous Intelligence and Computing and 9th International Conference on Autonomic and Trusted Computing, 2012, <http://ieeexplore.ieee.org/stamp/stamp.jsp?tp=&arnumber=6332013>.

\* cited by examiner

ADAPTIVE SAMPLING OF SMART METER DATA

BACKGROUND OF THE INVENTION

The present invention relates generally to the field of utility and smart meter networks, and more particularly to adaptive sampling of smart meter data with consideration of balancing constraints.

A smart meter is typically an electronic device that records consumption of energy in intervals of an hour or less and communicates that information to a utility for monitoring and billing purposes. Deployments of smart meters are designed for utility billing and some basic analysis requirements. The use of Advanced Metering Infrastructures (AMIs) differs from traditional automatic meter reading in that it enables two-way communications with the smart meter. Deployment of AMIs offers a wide range of opportunities for utilities and network operators: a higher spatio-temporal resolution of loads in the network (e.g., both space (location) and time considerations of network loads), information to build more accurate forecasting models, and information to perform more efficient optimization of the network. Problems with the collection of data from AMIs are the potential impact on the privacy of consumer, and the costs for data storage and transmission. A common way to mitigate these issues is data aggregation, which reduces the amount of information that is transmitted and stored.

SUMMARY

Aspects of an embodiment of the present invention disclose a method, a computer program product, and a computer system for adaptive sampling of smart meter data. The method includes, wherein each of the following steps are carried out by one or more computer processors, retrieving one or more balancing constraints associated with one or more smart meter sensors. The method further includes retrieving meter sensor data from the one or more smart meter sensors according to the one or more balancing constraints. The method further includes determining a subsample of the meter sensor data, and transmitting the subsample of the meter sensor data to an optimization engine for use in solving an optimization problem.

DETAILED DESCRIPTION

Figure 1:
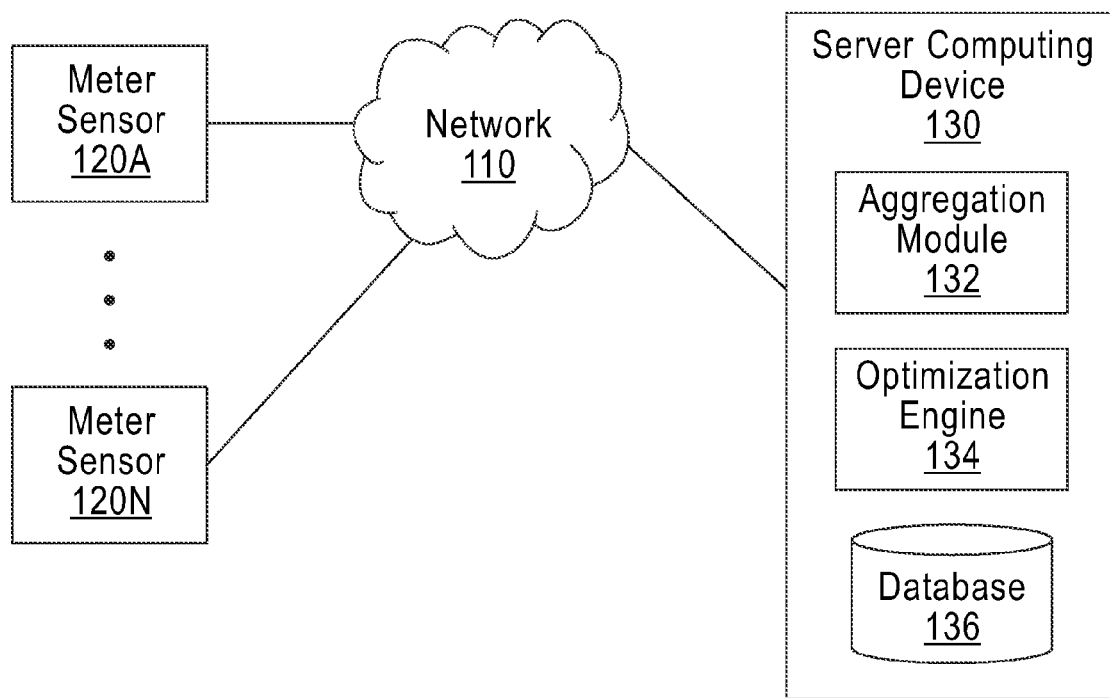
FIG. 1 is a functional block diagram illustrating a data processing environment, in accordance with an embodiment of the present invention.

The present invention will now be described in detail with reference to the Figures. FIG. 1 is a functional block diagram illustrating a data processing environment, generally designated 100, in accordance with one embodiment of the present invention. FIG. 1 provides only an illustration of one implementation and does not imply any limitations with regard to the environments in which different embodiments may be made by those skilled in the art without departing from the scope of the invention as recited by the claims.

Data processing environment 100 includes meter sensor 120A to meter sensor 120N (hereinafter "meter sensors 120A to 120N"), and server computing device 130, all interconnected via network 110. Network 110 can be, for example, a local area network (LAN), a wide area network (WAN), such as the Internet, a virtual local area network (VLAN), or any combination of the three, and can include wired, wireless, or fiber optic connections. In an embodiment, network 110 is a sensor communication network. In general, network 110 can be any combination of connections and protocols that will support communications between meter sensors 120A to 120N and server computer device 130, in accordance with embodiments of the present invention.

In an exemplary embodiment of the present invention, meter sensors 120A to 120N are smart meter sensors included within or connected to individual households, businesses, and other energy consuming parties and are capable of measuring electricity, water, and natural gas consumption. Meter sensors 120A to 120N represent a smart meter population with data processing environment 100 and transmit smart meter data in real time or near real time to server computing device 130 via network 110.

Server computing device 130 includes aggregation module 132, optimization engine 134, and database 136. In various embodiments, server computing device 130 can be a management server, a web server, a mobile computing device, or any other electronic device or computing system capable of receiving, sending, and processing data. In other embodiments, server computing device 130 can represent a server computing system utilizing multiple computers as a server system, such as in a cloud computing environment. In another embodiment, server computing device 130 can be a laptop computer, a tablet computer, a netbook computer, a personal computer, a desktop computer, or any programmable electronic device capable of communicating with meter sensors 120A to 120N and other devices present within data processing environment 100 (not shown) via network 110. In another embodiment, server computing device 130 represents a computing system utilizing clustered computers and components (e.g., database server computers, application server computers, etc.) that act as a single pool of seamless resources when accessed within data processing environment 100. In various embodiments, each of the programs, modules, and databases included on server computing device 130 may be located elsewhere within data processing environment 100 with access between each other and meter sensors 120A to 120N via network 110. Server computing device 130 may include internal and external hardware components, as depicted and described with reference to FIG. 4.

Aggregation module 132 retrieves balancing constraints from each household, business, or other energy consuming party and retrieves data from each of meter sensors 120A to 120N in order to provide optimization engine 134 with subsamples of data to solve an optimization problem. In various embodiments of the present invention, solving the optimization problem can include computing spatio-temporal correlations in the meter sensor data. The balancing constraints provide aggregation module 132 with limitations on how often, and when, to sample the data from each of meter sensors 120A to 120N. Aggregation module 132 operates in conjunction with optimization engine 134 to determine adaptive sampling requests to control the amount of information to be sampled from the meter sensor data. Aggregation module 132, upon receiving adaptive sampling requests from optimization engine 134, alternates the sampling from different meter sensors.

Optimization engine 134 determines and solves an optimization problem based on at least one subsample of meter sampling data received from each of meter sensors 120A to 120N. A component of optimization engine 134 performs a sensitivity analysis on the solution to the optimization problem to assess the uncertainty and sensitivity in the optimization problem, and determines a function of the solution to the problem in order to send at least one adaptive sampling request to aggregation module 132. The determined adaptive sampling request, based on properties of the optimization problem, can request sampling of meter sensor data with varied spatio-temporal resolutions, i.e., variations in which meter is sampled and when or for how long. While depicted as two separate modules in FIG. 1, aggregation module 132 and optimization engine 134 may operate as one module or program.

Database 136 stores data retrieved from each of meter sensors 120A to 120N, and statistical models updated by aggregation module 132 based on the data received. Database 136 also stores balancing constraints received for each meter sensor 120A to 120N from individual energy consuming parties.

Figure 2:
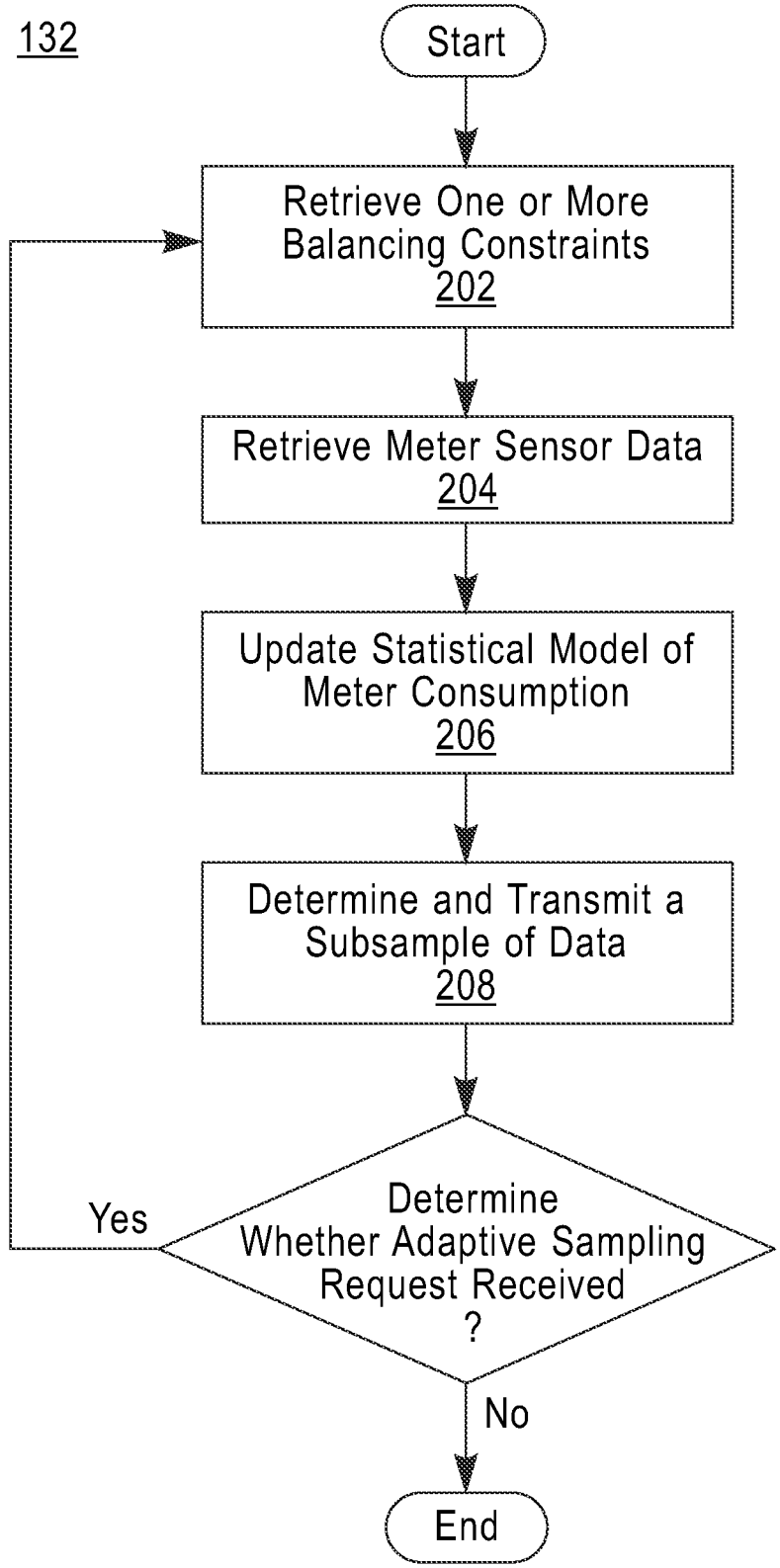
FIG. 2 is a flowchart depicting operational steps of an aggregation module, for performing adaptive sampling of smart meter data, in accordance with an embodiment of the present invention.

FIG. 2 is a flowchart depicting operational steps of aggregation module 132 for performing adaptive sampling of smart meter data, in accordance with an embodiment of the present invention.

Aggregation module 132 retrieves one or more balancing constraints (step 202). In the exemplary embodiment, balancing constraints are specified by individual households or businesses and limit the amount of data to be transmitted from each individual meter sensor 120A to 120N within a certain time interval. Balancing constraints can be dynamic and may be one or more of a restriction to a total amount of samples per meter during a specified period of time, a restriction to a maximum number of consecutive samples per meter, a restriction to a maximum number of repeated samples per meter for a specified time interval on a particular day of the week. For example, a household including meter sensor 120A may specify that only eight samples can be retrieved per day, with no repeated samples at the same time on consecutive days. An individual household or business can update or revise specified balancing constraints at any time. The specified balancing constraints associated with each smart meter are stored in database 136 for retrieval by aggregation module 132.

Aggregation module 132 retrieves meter sensor data (step 204). Aggregation module 132 retrieves meter sensor data from each of meter sensors 120A to 120N according to one or more adaptive sampling requests and in consideration of the one or more balancing constraints. The one or more adaptive sampling requests include a spatial and a temporal resolution at which the request requires data representative of the smart meter population. If there is not an adaptive sampling request, for example, at an initial operation of aggregation module 132 or when a new meter sensor is brought online or assigned to an existing cluster, aggregation module 132 retrieves meter sensor data according to any balancing constraints in place and stored in database 136, in order to build and maintain a statistical model of clusters of smart meters having similar consumption patterns, as discussed below with reference to step 206.

Aggregation module 132 updates a statistical model of meter consumption (step 206). Aggregation module 132 updates and maintains a statistical model for each cluster of smart meters having similar consumption patterns. The statistical model computes and provides a spatio-temporal correlation structure between meter sensor data location and time, incorporating, for example, a spatial correlation, indicating similarity in consumption pattern between meter sensor data, and a time correlation of data, including how long and how often to sample the data. Aggregation module 132 determines, based on similar consumption patterns of individual meter sensor data, each clustering of the smart meter population. Aggregation module 132 updates each cluster using data retrieved from each of meter sensors 120A to 120N, or, alternately, meter sensor data retrieved from a subset of meter sensors 120A to 120N, the subset including each meter sensor 120A to 120N included in the cluster being updated.

Aggregation module 132 determines at least one subsample of data and transmits the subsample to optimization engine 134 (step 208). In an exemplary embodiment, a sample of data is used with optimization engine 134 rather than data received from each meter sensor in order to protect against user profiling and to save bandwidth. In the exemplary embodiment, in a time interval, meter sensor data is retrieved from a subset of smart meters belonging to each cluster according to any balancing constraints associated with the smart meters, and according to any adaptive sampling request including a spatio-temporal resolution. In various embodiments, aggregation module 132 uses stratified sampling methods on the clusters to achieve a representation of statistical properties of data from the smart meter population, e.g., each of meter sensor 120A to 120 N. Stratified sampling from the clusters is used to reduce variance in the subsample. Aggregation module 132 aggregates the meter sensor data retrieved via the stratified sampling methods, or other such random sampling methods, to give an estimate of the energy consumption over the whole of the smart meter population, with the desired spatio-temporal resolution. The aggregated sample is transmitted to optimization engine 134 for use in an optimization problem.

Aggregation module 132 determines whether one or more adaptive sampling requests are received from optimization engine 134 (decision block 210). Optimization engine 134 determines an optimization problem, and using the determined at least one subsample of data, determines a solution to the problem. A function of the solution to the optimization problem provides an adaptive sampling request for sampling of meter sensor data to allow for computing spatio-temporal correlations between meter sensor data in order to retrieve samples of the smart meter data at a desired spatio-temporal resolution for an appropriate solution of the optimization problem. The data obtained using the adaptive sampling request can be used to, for example, simulate scenarios and assess risks in optimization and forecasting problems. The adaptive sampling request is sent to aggregation module 132. If no adaptive sampling requests are received ("no" branch, decision block 210), aggregation module 132 ends processing. If adaptive sampling requests are received from optimization engine 134 ("yes" branch, decision block 210), aggregation module 132 returns to retrieve one or more balancing constraints and perform another iteration of steps.

Figure 3:
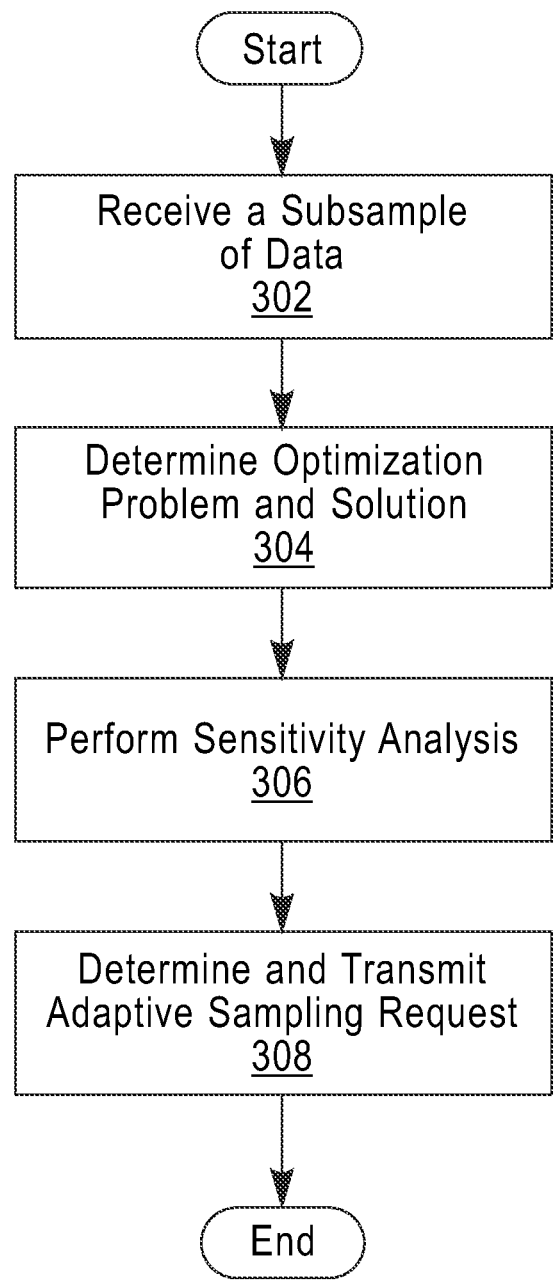
FIG. 3 illustrates operational steps of an optimization engine, for determining and solving an optimization problem, in accordance with an embodiment of the present invention.

FIG. 3 illustrates operational steps of optimization engine 134, for determining and solving an optimization problem, in accordance with an embodiment of the present invention.

Optimization engine 134 receives at least one subsample of data from aggregation module 132 (step 302). Aggregation module 132 determines and sends the subsample of meter sensor data to optimization engine 134, as discussed above with reference to FIG. 2.

Optimization engine 134 determines an optimization problem and a solution (step 304). An optimization problem determines a best solution from all possible solutions and can be, for example, a forecasting or control problem in an electricity network. In an exemplary embodiment, the optimization problem can optimize some function of electric power flow over a period of time, for example, a day or a week, based on predictions of electricity consumption.

Optimization engine 134 performs a sensitivity analysis (step 306). A component of the optimization problem performs a sensitivity analysis on the solution to the optimization problem with respect to inputs, i.e., the at least one subsample of meter sensor data. In general, a sensitivity analysis determines how uncertainty in an output can be apportioned to various sources of uncertainty in inputs, including variables that may have an impact on the inputs.

Optimization engine 134 determines and transmits an adaptive sampling request (step 308). The adaptive sampling request includes the required spatio-temporal resolution of smart meter consumption data, the granularity of which can change over time, for example, a finer time or space resolution is required because of sensitivity of the solution to values of external variables, for example, weather conditions, or a coarser resolution is sufficient because conditions are stationary. Based on the adaptive sampling request, aggregation module 132 determines a spatio-temporal sampling scheme which can alternate the sampling from different smart meter sensors, i.e., meter sensors 120A to 120N, in order to optimize the sampled information from the smart meter population while obeying the one or more balancing constraints.

Figure 4:
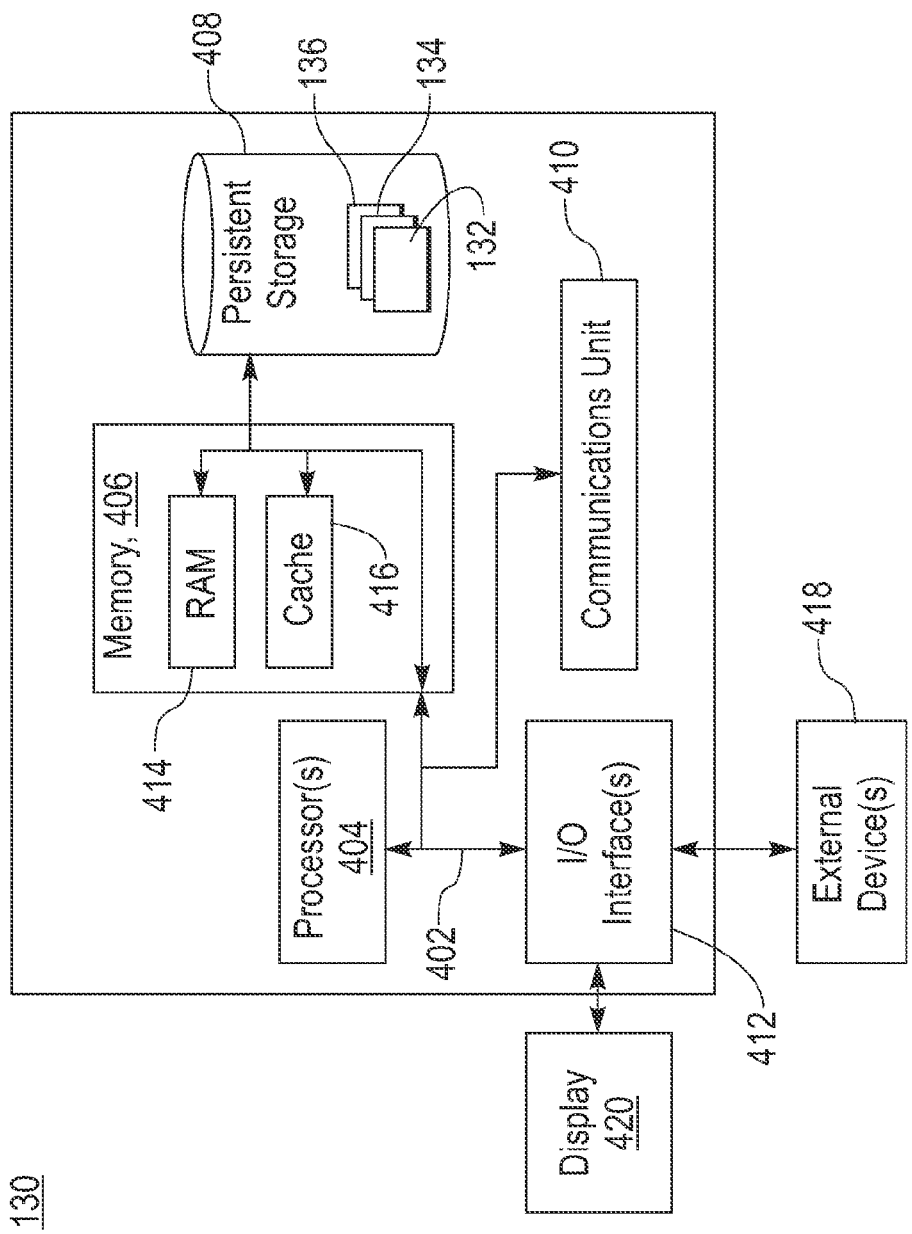
FIG. 4 is a block diagram of components of a data processing system, such as the server computing device of FIG. 1, in accordance with an embodiment of the present invention.

FIG. 4 depicts a block diagram of components of server computing device 130 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server computing device 130 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

Aggregation module 132, optimization engine 134, and database 136 can be stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including with meter sensors 120A to 120N within data processing environment 100. In these examples, communications unit 410 includes one or more network interface cards. Communications unit 410 may provide communications through the use of either or both physical and wireless communications links. Aggregation module 132, optimization engine 134, and database 136 may be downloaded to persistent storage 408 through communications unit 410.

I/O interface(s) 412 allows for input and output of data with other devices that may be connected to server computing device 130. For example, I/O interface(s) 412 may provide a connection to external device(s) 418 such as a keyboard, a keypad, a touch screen, and/or some other suitable input device. External device(s) 418 can also include portable computer readable storage media such as, for example, thumb drives, portable optical or magnetic disks, and memory cards. Software and data used to practice embodiments of the present invention, e.g., aggregation module 132, optimization engine 134, and database 136, can be stored on such portable computer readable storage media and can be loaded onto persistent storage 408 via I/O interface(s) 412. I/O interface(s) 412 also connect to a display 420. Display 420 provides a mechanism to display data to a user and may be, for example, a computer monitor or an incorporated display screen, such as is used, for example, in tablet computers and smart phones.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for adaptive sampling of smart meter data, the method comprising:
    retrieving one or more balancing constraints associated with one or more smart meter sensors;
    retrieving meter sensor data from the one or more smart meter sensors according to the one or more balancing constraints, wherein retrieving meter sensor data includes receiving at least one request for meter sensor data including a spatio-temporal resolution, wherein the spatio-temporal resolution is determined based, at least in part, on a sensitivity analysis on a solution to the optimization problem;
determining a subsample of the meter sensor data; and
transmitting the subsample of the meter sensor data to an optimization engine for use in solving an optimization problem;
wherein the steps are carried out by one or more computer processors.

2. The method of claim 1, wherein determining the subsample of the meter sensor data further comprises:
receiving at least one request for meter sensor data including a spatio-temporal resolution; and
determining the subsample of the meter sensor data, based, at least in part, on the spatio-temporal resolution and the one or more balancing constraints.

3. The method of claim 1, wherein determining the subsample of the meter sensor data further comprises:
determining at least one clustering of the one or more smart meter sensors, based, at least in part, on one or more similar consumption patterns of meter sensor data.

4. The method of claim 3, further comprising:
updating a statistical model for each of the at least one clustering, wherein the statistical model provides a spatio-temporal correlation between a location of the meter sensor data and a time of the meter sensor data.

5. The method of claim 3, further comprising:
receiving at least one request for meter sensor data including a spatio-temporal resolution; and
retrieving, based, at least in part, on the one or more balancing constraints and the at least one request, at least one sample of meter sensor data from each of the one or more smart meter sensors included in each of the at least one clustering.

6. The method of claim 5, further comprising:
aggregating the at least one sample of meter sensor data retrieved from each of the one or more smart meter sensors included in each of the at least one clustering.

7. A computer program product for adaptive sampling of smart meter data, the computer program product comprising:
one or more computer readable storage media and program instructions stored on the one or more computer readable storage media, the program instructions comprising:
program instructions to retrieve one or more balancing constraints associated with one or more smart meter sensors;
program instructions to retrieve meter sensor data from the one or more smart meter sensors according to the one or more balancing constraints, wherein retrieving meter sensor data includes program instructions to receive at least one request for meter sensor data including a spatio-temporal resolution, wherein the spatio-temporal resolution is determined based, at least in part, on a sensitivity analysis on a solution to the optimization problem;
program instructions to determine a subsample of the meter sensor data; and
program instructions to transmit the subsample of the meter sensor data to an optimization engine for use in solving an optimization problem.

8. The computer program product of claim 7, wherein program instructions to determine the subsample of the meter sensor data further comprise:
program instructions to receive at least one request for meter sensor data including a spatio-temporal resolution; and
program instructions to determine the subsample of the meter sensor data, based, at least in part, on the spatio-temporal resolution and the one or more balancing constraints.

9. The computer program product of claim 7, wherein the program instructions to determine the subsample of the meter sensor data further comprise:
program instructions to determine at least one clustering of the one or more smart meter sensors, based, at least in part, on one or more similar consumption patterns of meter sensor data.

10. The computer program product of claim 9, further comprising:
program instructions to update a statistical model for each of the at least one clustering, wherein the statistical model provides a spatio-temporal correlation between a location of the meter sensor data and a time of the meter sensor data.

11. The computer program product of claim 9, further comprising:
program instructions to receive at least one request for meter sensor data including a spatio-temporal resolution; and
program instructions to retrieve, based, at least in part, on the one or more balancing constraints and the at least one request, at least one sample of meter sensor data from each of the one or more smart meter sensors included in each of the at least one clustering.

12. The computer program product of claim 11, further comprising:
program instructions to aggregate the at least one sample of meter sensor data retrieved from each of the one or more smart meter sensors included in each of the at least one clustering.

13. A computer system for adaptive sampling of smart meter data, the computer system comprising:
one or more smart meter sensors;
one or more computer readable storage media;
program instructions stored on at least one of the one or more computer readable storage media for execution by at least one of the one or more computer processors, the program instructions comprising:
program instructions to retrieve one or more balancing constraints associated with the one or more smart meter sensors;
program instructions to retrieve meter sensor data from the one or more smart meter sensors according to the one or more balancing constraints, wherein retrieving meter sensor data includes program instructions to receive at least one request for meter sensor data including a spatio-temporal resolution, wherein the spatio-temporal resolution is determined based, at least in part, on a sensitivity analysis on a solution to the optimization problem;
program instructions to determine a subsample of the meter sensor data; and
program instructions to transmit the subsample of the meter sensor data to an optimization engine for use in solving an optimization problem.

14. The computer system of claim 13, wherein program instructions to determine the subsample of the meter sensor data further comprise:

program instructions to receive at least one request for meter sensor data including a spatio-temporal resolution; and program instructions to determine the subsample of the meter sensor data, based, at least in part, on the spatio-temporal resolution and the one or more balancing constraints.

15. The computer system of claim 13, wherein the program instructions to determine the subsample of the meter sensor data further comprise:

program instructions to determine at least one clustering of the one or more smart meter sensors, based, at least in part, on one or more similar consumption patterns of meter sensor data.

16. The computer system of claim 15, further comprising:
program instructions to receive at least one request for meter sensor data including a spatio-temporal resolution; and program instructions to retrieve, based, at least in part, on the one or more balancing constraints and the at least one request, at least one sample of meter sensor data from each of the one or more smart meter sensors included in each of the at least one clustering.

17. The computer system of claim 16, further comprising:
program instructions to aggregate the at least one sample of meter sensor data retrieved from each of the one or more smart meter sensors included in each of the at least one clustering.

* * * * *